United States Patent
Smith

(10) Patent No.: US 11,807,821 B2
(45) Date of Patent: Nov. 7, 2023

(54) PROCESS FOR THE MANUFACTURE OF A MINERAL ADMIXTURE FOR USE IN CONCRETE PRODUCTS BY SELECTIVE SIZING AND MILLING OF COAL ASH

(71) Applicant: ASH RECOVERY SYSTEMS, INC., Amarillo, TX (US)

(72) Inventor: Robert L. Smith, Murphy, NC (US)

(73) Assignee: ASH RECOVERY SYSTEMS, INC., Amarillo, TX (US)

( * ) Notice: Subject to any disclaimer, the term of this patent is extended or adjusted under 35 U.S.C. 154(b) by 472 days.

(21) Appl. No.: 17/138,127

(22) Filed: Dec. 30, 2020

(65) Prior Publication Data

US 2021/0198587 A1    Jul. 1, 2021

Related U.S. Application Data

(60) Provisional application No. 62/955,971, filed on Dec. 31, 2019.

(51) Int. Cl.
   *C10J 3/52*     (2006.01)
   *C04B 18/06*    (2006.01)

(52) U.S. Cl.
   CPC .............. *C10J 3/52* (2013.01); *C04B 18/061* (2013.01); *C10J 2300/1628* (2013.01)

(58) Field of Classification Search
   CPC .......... C04B 18/061; C04B 28/02; C10J 3/52; C10J 2300/1628; C10K 1/004; Y02W 30/91
   See application file for complete search history.

(56) References Cited

U.S. PATENT DOCUMENTS

| 4,040,852 A * | 8/1977 | Jones ....................... C04B 18/06 106/705 |
| 2017/0370050 A1 * | 12/2017 | Townsend ............... C04B 20/02 |
| 2018/0244573 A1 * | 8/2018 | Thomas .................. C04B 14/14 |

FOREIGN PATENT DOCUMENTS

CA    2961137 C  *  4/2018  ............... B09B 3/00

OTHER PUBLICATIONS

Hannan et al "A Comprehensive Review on the Properties of Coal Bottom Ash in Concrete as Sound Absorption Material", MATEC Web of Conferences 103, 01005, pp. 1-10 (Year: 2017).*

* cited by examiner

*Primary Examiner* — Anthony J Green
(74) *Attorney, Agent, or Firm* — DENTONS US LLP

(57) ABSTRACT

Provided are methods or preparing coal ash with acceptable concentrations of sulfur and/or carbon for using making concrete, as well as the coal ash products produced by the described methods.

22 Claims, No Drawings

PROCESS FOR THE MANUFACTURE OF A MINERAL ADMIXTURE FOR USE IN CONCRETE PRODUCTS BY SELECTIVE SIZING AND MILLING OF COAL ASH

RELATED APPLICATION DATA

This application claims priority to U.S. Provisional Application No. 62/955,971 filed Dec. 31, 2019, and all the benefits accruing therefrom under 35 U.S.C. § 119, the entire content of which is incorporated by reference to the extent permitted by law.

FIELD OF THE INVENTION

The present application relates generally to the field of use of coal ash in concrete. More specifically, the present application describes using coal ash in order to reduce levels of certain deleterious components, prepared by selectively screening out certain portions of ash and then milling the remaining material.

BACKGROUND OF THE INVENTION

Concrete is the material that is used worldwide in the construction industry for buildings and roads. Modern concrete typically includes stone, sand, cement, mineral admixtures, chemical admixtures, and water. Typical mineral admixtures are coal fly ash and ground granulated blast furnace slag. The primary function of mineral admixtures is to chemically react with lime produced by the hydration of Portland cement to create additional calcium silicates hydrates, thereby reducing the lime content of the concrete and creating a stronger and more durable concrete. The technical term for this type of mineral admixture is pozzolan—a siliceous or aluminous and siliceous material that in itself possesses little or no cementitious value, but will, in finely divided form and in the presence of water, chemically react with calcium hydroxide at ordinary temperatures to form compounds possessing cementitious properties. By far, the most used pozzolan in today's concrete products is coal fly ash produced by electric power plants. However, changes in the electric power industry have reduced the amount of coal ash produced as natural gas and biomass are being used as fuels, while solar, wind, and hyro-electric generation has increased. Additionally, the coal fly ash produced is of poor quality because of increasingly stricter environmental constraints, necessitating chemical additions to the process.

Sulfur is present in coal as organic sulfur compounds and as inorganic iron compounds known as pyrites (iron sulfides formed in the reducing atmosphere of coal formation). Upon combustion in a boiler, such as a circulating fluidized bed (CFB) boiler, this sulfur is oxidized to sulfur dioxide ($SO_2$) or sulfur trioxide ($SO_3$) and emitted into the atmosphere unless removed by scrubbing techniques. One such technique is to combust the coal in a fluidized bed of coal and limestone. As the coal is combusted and oxides of sulfur released, the limestone is calcined to calcium oxide (CaO) or quicklime. The oxides of sulfur chemically react with CaO to form calcium sulfite ($CaSO_3$) or calcium sulfate ($CaSO_4$), also known as anhydrite. Thus, the ash from these CFB boilers contains coal ash and calcium sulfite or calcium sulfate.

Carbon is present in the CFB boiler ash as unburned coal or carbonate carbon from uncalcined limestone. Unburned coal, when milled, presents a problem in that the fine carbon adsorbs the air-entraining admixtures and creates problems maintaining a constant air content in the concrete.

The main use for coal ash is as a mineral admixture in concrete. In order for coal ash to be used in concrete products, the sulfur in the ash, expressed as $SO_3$, must be below 5 percent in order to meet industry standards. By convention, $SO_3$ is the term used to express the sulfur content of materials used in concrete, such as Portland cement and mineral admixtures, even though $SO_3$ itself is a gas. The carbon content of ash is usually determined by loss-on-ignition (LOI). If the quantity of non-carbonate carbon is desired, then a total organic carbon determination is made.

In a CFB boiler, the coal and limestone (for sulfur removal) are suspended in a fluidized bed and combusted. The ashes from CFB units occur as both fly ash and bed ash. The ratio of fly ash to bed ash is typically 80% fly ash and 20% bed ash. The fly ash and bed ash may be collected together (comingled) or collected separately. The sulfur content of both the fly ash and the bed ash from CFB units normally exceeds the 5% $SO_3$ maximum specified by ASTM and AASHTO. The ash is a mixture of the ash from the coal and a calcium sulfate (or sulfite) residue from the sulfur scrubbing. The coal ash from CFB units differs from the coal ash from conventional coal-fired boilers in that because of the lower combustion temperatures in the CFB units, the ash is not melted into the glass beads usually associated with coal fly ash, but rather is calcined into a dehydroxylated shale or clay. This ash is really a calcined natural pozzolan with varying amounts of sulfur scrubber material. The small amount of scrubber material in both the fly ash and bed ash may still produce a material whose $SO_3$ content exceeds the 5% maximum specified by American Society for Testing and Materials (ASTM) C618 and American Association of State Highway and Transportation Officials (AASHTO) M295 for use in concrete.

Because of these factors, there exists a need to produce good pozzolans which contain 5% or less of $SO_3$.

DETAILED DESCRIPTION

It has been discovered that coal ash from a CFB boiler or unit can be processed to produce a material that meets industry standards, such as American Society for Testing and Materials (ASTM) C618 and AASHTO M295, for use in concrete.

Sulfur and Carbon Reduction

It has been discovered that the sulfur content of CFB boiler bed ash was concentrated in the smaller particle sizes and that by removing the finer fraction and milling the coarser fraction, a material that meets ASTM and AASHTO specifications for concrete was produced.

According to embodiments described herein, coal ashes from three different CFB boilers were examined. Example 1 was a bed ash from a bituminous coal source. Example 2 was a comingled fly ash and bed ash from an anthracitic coal-fired CFB boiler. A bed ash from another anthracitic coal-fired CFB boiler was used, as shown by example 3. A gradation was conducted on these ashes and the different fractions were analyzed for sulfur content in order to determine the cutoff to produce a material whose sulfur content was less than 5 percent $SO_3$. Similarly, a gradation was conducted on these ashes, and the different fractions were analyzed for carbon (LOI) content in order to determine the fractions containing less carbon (LOI).

Unconfined Compressive Strength

After the coal ash was screened to reduce the sulfur and/or carbon content to acceptable concentrations, the material was milled to a fineness that meet ASTM and AASHTO specifications, specifically that no more than 34 percent was retained on a 325 sieve when wet sieved. To determine the pozzolanic quality of a coal ash, which defines the ability to form strength in a concrete environment, ASTM and AASHTO specifications have a test procedure known as the strength activity index. In this test procedure, 2"×2" mortar cubes are cast with cement, sand, and water (these are known as the control cubes) and another set of 2"×2" mortar cubes are cast with cement, ash, sand and water. The unconfined compressive strengths of the mortar cubes are determined, and the strength of the cubes containing ash is compared to the strength of the control cubes. To meet ASTM and AASHTO specifications, the strength of the cubes containing ash must be at least 75 percent of the strength of the control cubes after curing 7 or 28 days. The unconfined compressive strength and strength activity index results of example 1 ash, example 2 ash, and example 3 ash are shown below in TABLE I:

TABLE I

Cube Strength over Time

| Mix Parameters | Cube Strength, psi | | | % of Control | | | Water Requirement |
|---|---|---|---|---|---|---|---|
| | 3 Days | 7 Days | 28 Days | 3 Days | 7 Days | 28 Days | % of Control |
| Example 1 | | | | | | | |
| Cement Control | 3425 | 4460 | 5460 | 100 | 100 | 100 | 100 |
| 20% by wt. Ash | 3225 | 4100 | 5635 | 94 | 92 | 103 | 97 |
| Example 2 | | | | | | | |
| Cement Control | 3710 | 4790 | 6010 | 100 | 100 | 100 | 100 |
| 20% by wt. Ash | 3075 | 4085 | 5810 | 83 | 85 | 89 | 96 |
| Example 3 | | | | | | | |
| Cement Control | 3250 | 4415 | 5715 | 100 | 100 | 100 | 100 |
| 20% by wt. Ash | 3115 | 4125 | 5825 | 96 | 93 | 102 | 100 |

The results indicate that coal ash from a CFB boiler can be screened and milled to produce an excellent mineral admixture for use in concrete products.

Other physical characteristics of the processed ashes are shown below in TABLE II:

TABLE II

Additional Characteristics of Processed Ashes

| Sample | Blaine Fineness, $cm^2/g$ | +325 Fineness, wt % | Density |
|---|---|---|---|
| Example 1 | 11,420 | 13.4 | 2.70 |
| Example 2 | 9,865 | 10.1 | 2.62 |
| Example 3 | 12,175 | 6.0 | 2.60 |

While a mandated 20% by weight amount of coal ash was used in these examples, the coal ash can be added in the range of 5% to 50% by weight dependent on the end use of the concrete product and the cementitious material mix, as is typically known.

Illustrative Processes

One embodiment of a method of manufacturing a material for use in concrete products by reducing sulfur concentration of a coal ash may include selectively screening the coal ash based on a predetermined particle size to remove a portion of the coal ash with high sulfur concentrations to yield a screened ash product. The screened coal ash particles may be at least as big as the predetermined particle size. The size of the screened ash may be reduced such that reduced size particles of the coal ash have particle sizes that meet fineness requirements set forth in American Society for Testing and Materials (ASTM) and/or American Association of State Highway and Transportation Officials (AASHTO) specifications for coal ash for use with concrete.

In an embodiment, selectively screening the coal ash may include obtaining coal ash from a fluidized-bed combustion boiler. Selectively screening the coal ash may also include selectively screening the coal ash such that the screened ash product results in an $SO_3$ content of 5% or less, by weight. In an embodiment, the processing may include milling the screened ash product. In one embodiment, the process may further include removing a portion of the coal ash with a high carbon concentration while selectively screening the coal ash. A coal ash product may be produced by the process.

A method to manufacture a material for use in concrete products by reducing sulfur and/or carbon concentrations of a coal ash may include selectively screening the coal ash based on a predetermined particle size to remove fractions of the coal ash with high sulfur and/or carbon concentrations to yield a screened ash product. The fractions may include particles with particle sizes at least as big as the predetermined particle size. The screened ash product may be processed such that particles are produced having particle sizes meeting fineness requirements set forth in ASTM and/or AASHTO specifications for coal ash for use on concrete.

The coal ash may be obtained from a fluidized-bed combustion boiler. The coal ash may result in a screened ash product with a reduced carbon concentration compared to the coal ash. The processing may include milling the screened ash product. A portion of the coal ash with a high sulfur concentration may be removed while selectively screening the coal ash. A coal ash product may be produced by the process.

The foregoing disclosure is not intended to limit the present disclosure to the precise forms or particular fields of use disclosed. As such, it is contemplated that various alternative embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims. Reference to additives in the specification are generally to operative additives unless otherwise noted in the specification.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed battery system. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Reference to "about" or "approximately" is to be construed to mean plus or minus 10%.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

The previous description is of a preferred embodiment for implementing the invention, and the scope of the invention should not necessarily be limited by this description. The scope of the present invention is instead defined by the following claims.

What is claimed is:

1. A method of manufacturing a coal ash material for use in concrete products by reducing sulfur concentration of a coal ash, the method comprising:
    selectively screening the coal ash based on a predetermined particle size to remove a portion of the coal ash with sulfur concentrations higher than a desired sulfur concentration to yield a screened ash product, particles of the screened ash product being at least as big as the predetermined particle size; and
    reducing the size of the particles of the screened ash product to produce the coal ash material meeting fineness requirements set forth in American Society for Testing and Materials (ASTM) specifications, American Association of State Highway and Transportation Officials (AASHTO) specifications, or both the ASTM specifications and the AASHTO specifications for coal ash for use with concrete.

2. The method according to claim 1, wherein the coal ash comprises bed coal ash from a fluidized-bed combustion boiler.

3. The method according to claim 1, wherein selectively screening the coal ash includes selectively screening the coal ash such that the resulting screened ash product has an $SO_3$ content of 5% or less, by weight.

4. The method according to claim 1, wherein reducing the size of the particles of the screened ash product includes milling the screened ash product.

5. The method according to claim 4, further comprising removing a portion of the coal ash with a carbon concentration higher than a desired carbon concentration while selectively screening the coal ash.

6. The method of claim 5, wherein removing a portion of the coal ash with a carbon concentration higher than a desired carbon concentration results in the carbon ash material having a maximum loss-on-ignition of 6% as specified by the ASTM requirements of use of coal ash with cement.

7. The method of claim 1, wherein the coal ash material meets the fineness requirements set forth in the American Society for Testing and Materials (ASTM) standard C618, for coal ash for use with concrete.

8. The method of claim 1, wherein the coal ash materials meets the fineness requirements set forth in the American Association of State Highway and Transportation Officials (AASHTO) standard M295 for coal ash for use with concrete.

9. The method of claim 1, wherein the coal ash material meets the fineness requirements set forth in the American Society for Testing and Materials (ASTM) standard C619 and the American Association of State Highway and Transportation Officials (AASHTO) standard M295 for coal ash for use with concrete.

10. A method of manufacturing a coal ash material for use in concrete products by reducing a carbon concentration of a coal ash, the method comprising:
    selectively screening the coal ash based on a predetermined particle size to remove fractions of the coal ash with carbon concentrations higher than a predetermined carbon concentration to yield a screened ash product, the fractions including particles with particle sizes at least as big as the predetermined particle size; and
    processing the screened ash product to produce the coal ash material meeting fineness requirements set forth in American Society for Testing and Materials (ASTM) specifications, American Association of State Highway and Transportation Officials (AASHTO) specifications, or both the ASTM specifications and the AASHTO specifications for coal ash for use with concrete.

11. The method according to claim 10, wherein the coal ash includes bed coal ash from a fluidized-bed combustion boiler.

12. The method according to claim 10, wherein the screened ash product has a reduced carbon concentration compared to the coal ash.

13. The method according to claim 10, wherein processing includes milling the screened ash product.

14. The method according to claim 13, further comprising removing a portion of the coal ash with a sulfur concentration higher than a desired sulfur concentration while selectively screening the coal ash.

15. The method of claim 10, wherein removing a portion of the coal ash with a carbon concentration higher than a predetermined carbon concentration results in the carbon ash material having a maximum loss-on-ignition of 6% as specified by the ASTM requirements of use of coal ash with cement.

16. The method of claim 14, wherein selectively screening the coal ash includes selectively screening the coal ash such that the resulting screened ash product has an $SO_3$ content of 5% or less, by weight.

17. The method of claim 10, wherein the coal ash material meets the fineness and loss of ignition requirements set forth in the American Society for Testing and Materials (ASTM) standard C619, for coal ash for use with concrete.

18. The method of claim 10, wherein the coal ash materials meets the fineness and loss of ignition requirements set forth in the American Association of State Highway and Transportation Officials (AASHTO) standard M295 for coal ash for use with concrete.

19. The method of claim 10, wherein the coal ash material meets the fineness and loss of ignition requirements set forth in the American Society for Testing and Materials (ASTM) standard C619 and the American Association of State Highway and Transportation Officials (AASHTO) standard M295 for coal ash for use with concrete.

20. A method of making a concrete product comprising:
selectively screening coal ash based on a predetermined particle size to remove a portion of the coal ash with sulfur concentrations higher than a desired sulfur concentration to yield a screened ash product, particles of the screened ash product being at least as big as the predetermined particle size;
reducing the size of the particles of the screened ash product to produce the coal ash material meeting fineness requirements set forth in American Society for Testing and Materials (ASTM) specifications, American Association of State Highway and Transportation Officials (AASHTO) specifications, or both the ASTM specifications and the AASHTO specifications for coal ash for use with concrete; and
admixing the coal ash material with concrete materials, including a cementitious material, to produce the concrete product.

21. A method comprising:
selectively screening coal ash, which does not contain coal fly ash, based on a predetermined particle size to remove a portion of the coal ash with sulfur concentrations higher than a desired sulfur concentration to yield a screened ash product, particles of the screened ash product being at least as big as the predetermined particle size;
reducing the size of the particles of the screened ash product to produce the coal ash material meeting fineness requirements set forth in American Society for Testing and Materials (ASTM) specifications, American Association of State Highway and Transportation Officials (AASHTO) specifications, or both the ASTM specifications and the AASHTO specifications for coal ash for use with concrete; and
admixing the coal ash material with concrete materials, including a cementitious material, to produce a concrete product.

22. A method comprising:
selectively screening coal ash, which does not contain coal fly ash, based on a predetermined particle size to remove fractions of the coal ash with carbon concentrations higher than a predetermined carbon concentration to yield a screened ash product, the fractions including particles with particle sizes at least as big as the predetermined particle size;
processing the screened ash product to produce the coal ash material meeting fineness requirements set forth in American Society for Testing and Materials (ASTM) specifications, American Association of State Highway and Transportation Officials (AASHTO) specifications, or both the ASTM specifications and the AASHTO specifications for coal ash for use with concrete; and
admixing the coal ash material with concrete materials, including a cementitious material, to produce a concrete product.

\* \* \* \* \*